Aug. 18, 1931.    C. S. WEYANDT    1,819,009

TIE TAMPING SYSTEM AND METHOD OF OPERATING THE SAME

Original Filed June 1, 1928

Inventor
Carl S. Weyandt
By Cornelius L. Ehret
Attorney.

Patented Aug. 18, 1931 1,819,009

UNITED STATES PATENT OFFICE

CARL S. WEYANDT, OF PITTSBURGH, PENNSYLVANIA

TIE-TAMPING SYSTEM AND METHOD OF OPERATING THE SAME

Original application filed June 1, 1928, Serial No. 282,103, which is a division of Serial No. 85,245 filed February 1, 1926, now Patent No. 1,680,311, dated August 14, 1928. Divided and this application filed December 3, 1929. Serial No. 411,235.

My invention relates to improvements in tie-tamping systems and methods of operating the same.

In accordance with my invention, in a tie-tamping system, a plurality of tie-tampers are operated in phase from a source of alternating current, causing simultaneous impacts upon the tamping tools, whereby the simultaneous blows are more effective, under certain circumstances, than single blows or single blows occuring at different times.

Further in accordance with my invention, under suitable circumstances, two or more tie-tampers are operated at the same frequency, or are caused to strike the tamping blow dis-simultaneously.

Further in accordance with my invention, a polyphase source of alternating current is utilized to supply a plurality of tie-tampers, one or more of the tie-tampers operated from one phase and one or more from another phase, for which purpose means are provided for transferring one or more tie-tampers from one phase to another of the polyphase source of current.

My invention, further, resides in the method and system as hereinafter described and claimed.

This application is a division of my application Serial No. 282,103, filed June 1, 1928, and relating to improvements in method of and apparatus for operating electric motors, the latter directed to subject matter divided from my application Serial No. 85,245, filed Feb. 1, 1926 upon which Letters Patent No. 1,680,311 were granted August 14, 1928.

For the purpose of illustrating my invention, a tie-tamping system embodying the same and which may be operated in accordance with my improved method is shown in the drawings, in which.

Figure 1:
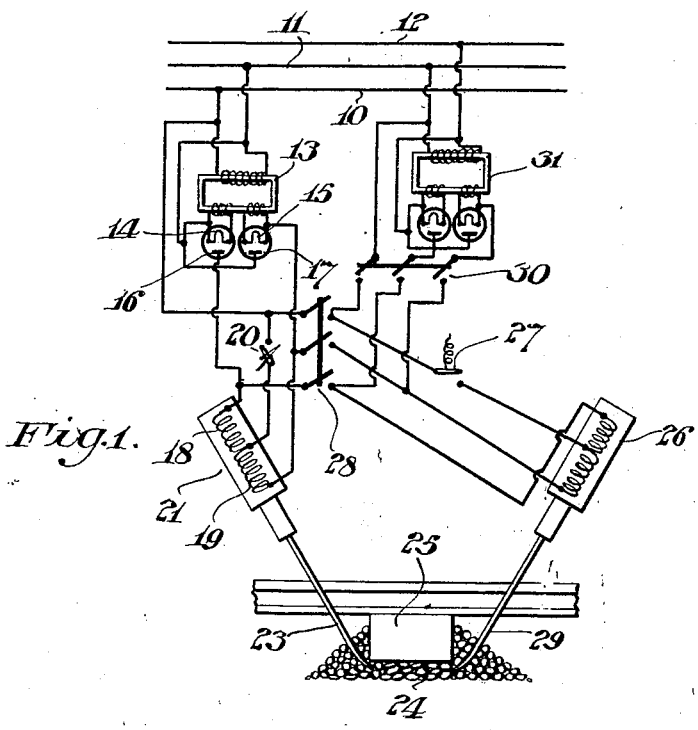
Figure 1 is a schematic view of a tie-tamping system embodying the present improvements.

In Fig. 1 there are shown alternating current supply conductors 10, 11 and 12 delivering polyphase alternating current, for example, a two-phase current. The current for phase A is delivered, for example, by conductors 10 and 11, and the current from phase B is delivered by conductors 11 and 12. In the case of the usual two-phase current, the electromotive force waves of the two phases are in quadrature.

Figure 2:
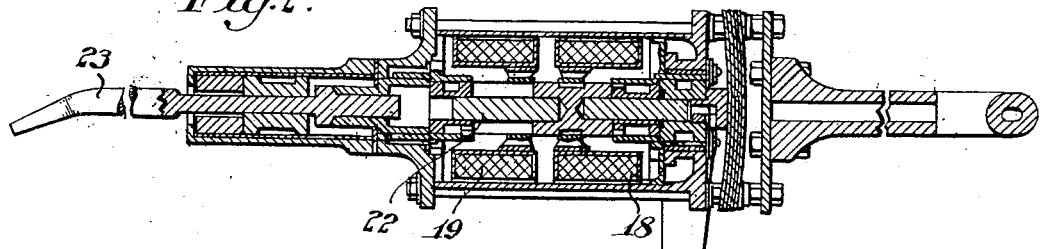
Fig. 2 is an enlarged elevational sectional view of a tie-tamper of the general type which may be used in the system in Fig. 1.

Across conductors 10 and 11 is connected the primary of a transformer 13 provided with two secondaries delivering current, respectively, to the filaments 14 and 15 of thermionic valves, whose anodes or plates are indicated at 16 and 17. The valves are connected, respectively, in circuit with the windings 18 and 19, whose circuits are closed upon closure of switch 20. The windings 18 and 19 constitute electromagnetic means forming part of the tie-tamper 21 of the general type shown in Fig. 2, these windings being effective upon excitation thereof to impart oscillatory or reciprocatory movement to the power element or core 22 which strikes or impacts with the tamper bar 23. The tamper bar 23 operates upon the ballast or broken stone 24 to drive the same into place, and particularly to tamp it under the railway tie 25. A second tie-tamper 26, similar in construction and principle of operation to tie-tamper 21 and controlled by switch 27, may be connected in parallel with tie-tamper 21 by closure of switch 28. The tie-tamper 26 will then be supplied through the same valves supplying tie-tamper 21, whereby the tamping bars or tools 23 and 29 are simultaneously struck by their respective associated power elements or cores 22. Switch 28 may connect tie-tamper 26 to phase A through a valve system separate and independent from the valve system supplying tie-tamper 21. This operation of the tamping bars 23 and 29 at the same instants is of advantage for the reason that the broken stone or ballast is more readily and effectively compacted and forced into position under the tie. This is particularly true when the two tie-tampers are used on opposite sides and at the same end of the tie.

If it is desired that the tie-tampers operate out of phase with each other, but at the same frequency, switch 28 is opened and tie-tamper 26 connected to phase B through switch 30 and the valve system indicated generally by reference numeral 31. In this case, the tamper bars 23 and 29 will be struck the same number of times per unit of time, but at different instants. Suitable interconnecting means may be provided between switches 28 and 30 to prevent their simultaneous closure.

Figure 3:
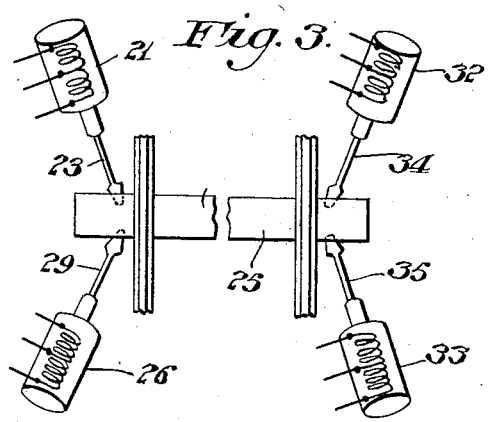
Fig. 3 is a schematic, plan view further illustrating the improved method of tie-tamping in accordance with my invention.

In Fig. 3, the tie-tampers 21 and 26 are more clearly shown, as operating at the same end of tie 25 and on opposite sides thereof. As explained, the tamper bars 23 and 29 operate either simultaneously or dis-simultaneously, depending upon whether switch 28 is closed and switch 30 open, or switch 28 open and switch 30 closed. Simultaneously with operation of tie-tampers 21 and 26, similar tie-tampers 32 and 33 may be operated at the other end of the tie on opposite sides thereof, the connection for these tie-tampers providing for either simultaneous or dis-simultaneous actuation of the associated tamper bars 34 and 35.

From the foregoing it will be obvious that tie-tampers 21 and 32 on the same side of the tie and at opposite ends or at different positions longitudinally thereof, may be connected to the supply source in such wise as to cause either simultaneous or dis-simultaneous actuation of their respective tamper bars 23 and 34.

Further, tie-tampers such as 26 and 32 on opposite sides of the tie and at different positions longitudinally thereof, may be connected to the supply source in such wise as to cause either simultaneously or dis-simultaneous actuation of their respective tamper bars 29 and 34.

It will be apparent that the tie-tamper structure may take different form than herein illustrated. For example, the movable core or armature member may partake of movement about a pivotal position in response to excitation of the electromagnetic means or windings 18 and 19, instead of guided rectilinear alternate movement. Furthermore, it is not essential that the armature member or core move freely to effect impact or percussion. That is, the tamper bar may be directly connected to the armature, to act as a continuous load on the latter.

The invention claimed is:

1. In a tie-tamping system comprising a source of alternating current, a pair of tie-tampers each comprising a magnetizable reciprocating element, a tamping tool adapted to be struck thereby, and field-producing structure for effecting reciprocation of said element, the method of tamping ballast for ties and the like, which comprises relating the field-producing structures of the tampers to said source so that the reciprocating elements thereof move in phase with each other, and tamping the ballast adjacent one side of a tie at different positions longitudinally thereof by simultaneous blows of the tamping tools.

2. In a tie-tamping system comprising a plurality of sources of alternating current differing in phase but of the same frequency, a plurality of tie-tampers each comprising a magnetizable reciprocating element, a tamping tool adapted to be struck thereby, and field-producing structure for effecting reciprocation of said element, the method of tamping ballast for ties and the like which comprises relating said field-producing structures to the different sources so that the corresponding reciprocating elements move out of phase with each other, and tamping said ballast at opposite sides of a tie by dis-simultaneous blows of said tamping tools.

3. In a tie-tamping system comprising a plurality of sources of alternating current differing in phase but of the same frequency, a plurality of tie-tampers each comprising a magnetizable reciprocating element, a tamping tool adapted to be struck thereby, and field-producing structure for effecting reciprocation of said element, the method of tamping ballast for ties and the like which comprises relating said field-producing structures to the different sources so that the corresponding reciprocating elements move out of phase with each other, and tamping said ballast at different positions longitudinally of the tie by dis-simultaneous blows of said tamping tools.

4. A tie-tamping system comprising a plurality of tie-tampers each having a power element disposed for oscillatory movement and electromagnetic means effective upon excitation thereof to impart such movement to the associated element, means providing a source of spaced electrical impulses, and switch means providing for connection of each of said tie-tampers to said second-named means in such wise as to subject the electromagnetic means of each of said tie-tampers to the same number of such impulses per unit of time.

5. A tie-tamping system comprising a plurality of tie-tampers each having a power element disposed for oscillatory movement and electromagnetic means effective upon excitation thereof to impart such movement to the associated element, means providing a source of spaced electrical impulses, and switch means providing for connection of each of said tie-tampers to said second-named means in such wise as to subject the electromagnetic means of each of said tie-tampers to simultaneously occurring electrical impulses.

6. In a tie-tamping system, a polyphase source of current, a plurality of tie-tampers each including a reciprocating motor comprising a reciprocating core system and electromagnetic actuating means therefor, and switching mechanism for bringing the electromagnetic actuating means of said motors into common association either with one phase or different phases of said source.

7. A tie-tamping system comprising a source of alternating current, a plurality of tie-tampers each including a reciprocating motor comprising a reciprocating core system and electromagnetic actuating means therefor, one of said motors connected to said source of alternating current, and switching means for connecting the corresponding energizing portions of the electromagnetic actuating means of said motors in parallel with each other to cause their reciprocating core systems to move in phase with each other.

8. In a tie-tamping system, a polyphase source of current, a plurality of tie-tampers each including a reciprocating motor comprising a reciprocating core system and electromagnetic actuating means therefor, and switching mechanism for bringing the electromagnetic actuating means of each of said motors either into parallel relation with each other for energization from one phase, or into independent association with different phases of said polyphase source of current.

9. In a tie-tamping system, a polyphase source of current, a plurality of tie-tampers each including a reciprocating motor comprising a reciprocating core system and electromagnetic actuating means therefor, and switching mechanism for bringing corresponding electromagnetic actuating means of each of said motors either into parallel relation with each other for energization from one phase to cause their respective reciprocating core systems to move in phase with each other, or into independent association with different phases of said polyphase source of current to cause said core systems to reciprocate at the same frequency and to deliver blows dis-simultaneously.

10. A tie-tamping system comprising a source of alternating current, a plurality of tie-tampers each including a reciprocating motor comprising a reciprocating core system and electromagnetic actuating means therefor, asymmetrical conductors connected between said motors and source of alternating current, and means for relating the electromagnetic means of the motors to said asymmetrical conductors to cause the respective reciprocating core system to move in phase with each other.

11. A tie-tamping system comprising a plurality of tie-tampers each having a power element disposed for oscillatory movement, and means common with respect to said tie-tampers for effecting such movement of the power element associated with any one of said tie-tampers synchronously with such movement of the respective elements associated with the remaining tie-tampers.

12. A tie-tamping system comprising a source of alternating current, a plurality of tie-tampers each having a reciprocating armature system for operating tamping structure and electro-magnetic actuating means, and switching mechanism for connecting the electro-magnetic actuating means of said motors to said source and selectively operable to effect movement of their tamping structures out of phase with each other or in phase with each other.

13. A tie-tamping system comprising a source of atlernating current, at least two rectifier systems, a plurality of tie-tampers each having a reciprocating armature system for operating tamping structure and electro-magnetic actuating means, and switching mechanism selectively operable to connect the electro-magnetic actuating means of at least one of said motors to one or another of said rectifier systems to attain simultaneous or dissimultaneous blows of said tamping structures.

14. A tie-tamping system comprising a source of polyphase alternating current, a tie tamper comprising a reciprocating armature system for operating tamping structure and electro magnetic actuating means, and switching mechanism operable to select the phase of said current source to which said electro-magnetic actuating means is connected.

CARL S. WEYANDT.